US011787379B2

United States Patent
Ko

(10) Patent No.: US 11,787,379 B2
(45) Date of Patent: Oct. 17, 2023

(54) ELECTRONIC PARKING BRAKE SYSTEM

(71) Applicant: HL MANDO CORPORATION, Gyeonggi-do (KR)

(72) Inventor: Weonchan Ko, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 229 days.

(21) Appl. No.: 17/352,030

(22) Filed: Jun. 18, 2021

(65) Prior Publication Data

US 2021/0394734 A1  Dec. 23, 2021

(30) Foreign Application Priority Data

Jun. 23, 2020  (KR) ........................ 10-2020-0076498

(51) Int. Cl.
| | | |
|---|---|---|
| *B60T 13/74* | (2006.01) | |
| *F16D 51/24* | (2006.01) | |
| *F16D 65/22* | (2006.01) | |
| F16D 121/04 | (2012.01) | |
| F16D 121/24 | (2012.01) | |
| F16D 125/42 | (2012.01) | |

(52) U.S. Cl.
CPC ............ *B60T 13/741* (2013.01); *F16D 51/24* (2013.01); *F16D 65/22* (2013.01); *B60Y 2400/81* (2013.01); *F16D 2121/04* (2013.01); *F16D 2121/24* (2013.01); *F16D 2125/42* (2013.01)

(58) Field of Classification Search
CPC ........ B60T 13/741; F16D 51/24; F16D 65/22; F16D 2121/04; F16D 2121/24; F16D 2125/42
See application file for complete search history.

(56) References Cited

U.S. PATENT DOCUMENTS

| | | | | |
|---|---|---|---|---|
| 3,809,191 | A * | 5/1974 | Woodward | ............. F16D 65/22 92/75 |
| 2004/0178028 | A1* | 9/2004 | Farmer | ................... F16D 65/18 188/162 |
| 2016/0025171 | A1* | 1/2016 | Choi | ...................... F16D 51/30 188/325 |

(Continued)

FOREIGN PATENT DOCUMENTS

| | | |
|---|---|---|
| DE | 20 2017 102 563 | 9/2017 |
| DE | 10 2017 008 196 | 2/2019 |

(Continued)

OTHER PUBLICATIONS

Machine Translation of FR 3016010 (no date).*

(Continued)

*Primary Examiner* — Nicholas J Lane
(74) *Attorney, Agent, or Firm* — Ladas & Parry, LLP

(57) ABSTRACT

Disclosed is an electronic parking brake system, which is configured to push first and second brake shoes respectively disposed on inner opposite sides of a drum to an inner surface of the drum for braking, including an actuator including a motor configured to rotate forward and reverse to generate a driving force for braking, and a reduction gear unit configured to amplify the driving force transmitted from the motor, and a power converter configured to convert a rotational motion from the actuator into a linear motion to press or release the first and second brake shoes.

16 Claims, 8 Drawing Sheets

(56) References Cited

U.S. PATENT DOCUMENTS

2018/0238408 A1* 8/2018 Song .................. F16D 65/18
2018/0283507 A1* 10/2018 Lee .................. F16H 37/041
2020/0056667 A1* 2/2020 Choi .................. B60T 1/067

FOREIGN PATENT DOCUMENTS

| DE | 10 2018 216 509 | 3/2020 | |
|----|-----------------|--------|---|
| FR | 3016010 A1 * | 7/2015 | ............. B60T 13/02 |
| JP | 2019-505427 | 2/2019 | |
| KR | 2000-0044704 | 7/2000 | |
| KR | 10-1532231 | 7/2015 | |
| WO | 2015/159591 | 10/2015 | |

OTHER PUBLICATIONS

Office Action dated May 23, 2022 for German Patent Application No. 10 2021 206 431.0 and its English machine translation by Google Translate.

* cited by examiner

ELECTRONIC PARKING BRAKE SYSTEM

CROSS-REFERENCE TO RELATED APPLICATION(S)

This application is based on and claims priority under 35 U.S.C. § 119 to Korean Patent Application No. 10-2020-0076498, filed on Jun. 23, 2020, in the Korean Intellectual Property Office, the disclosure of which is incorporated by reference herein in its entirety.

BACKGROUND

1. Field

The disclosure relates to an electronic parking brake system, and more particularly, to an electronic parking brake system applied to a drum brake and operated through a motor and a gear.

2. Description of the Related Art

In general, a brake apparatus, which is mounted on a vehicle to decelerate a vehicle while driving or to maintain a stop or stop state, performs a braking action by converting kinetic energy during driving into thermal energy through a mechanical friction device.

Such a brake apparatus is largely classified into a drum brake apparatus and a disc brake apparatus, which perform a braking action through braking hydraulic pressure.

A conventional drum brake apparatus includes a drum to rotate together with a wheel of a vehicle, and two brake shoes installed inside the drum to brake the drum through friction with an inner surface of the drum. Inside the drum, an operating lever is provided that pushes the two brake shoes toward the inner surface of the drum when a parking cable linked with a parking lever located on a driver seat is pulled. That is, because the conventional parking brake apparatus has a structure in which the parking cable is pulled by the operation of the parking lever to press the brake shoes, the brake shoes are moved in a braking direction to generate a braking force.

However, in such a conventional manual parking brake apparatus, there is an inconvenience in that a driver has to pull the parking lever with an appropriate force, the number of parts such as an equalizer and a cable fixing device for installing the parking cable and time for assembling increases, and the utilization of an internal space of a vehicle is reduced due to the installation of the parking lever.

In order to solve the various disadvantages of the manual parking brake apparatus, in recent years, an electronic parking brake system that automatically performs braking using a motor has been proposed. Such an electric drum brake apparatus is disclosed in Korean Patent No. 2000-0044704, and various researches and developments are underway to increase the usability of an installation space for a brake apparatus, compact a structure thereof, and improve the operating performance.

SUMMARY

It is an aspect of the disclosure to provide an electronic parking brake system capable of generating a braking force through a rotational force generated from a motor, operating more smoothly and stably by improving a connection structure between components, and generating a large braking force.

Additional aspects of the disclosure will be set forth in part in the description which follows and, in part, will be obvious from the description, or may be learned by practice of the disclosure.

In accordance with an aspect of the disclosure, an electronic parking brake system, which is configured to push first and second brake shoes respectively disposed on inner opposite sides of a drum to an inner surface of the drum for braking, includes an actuator including a motor configured to rotate forward and reverse to generate a driving force for braking, and a reduction gear unit configured to amplify the driving force transmitted from the motor, and a power converter configured to convert a rotational motion from the actuator into a linear motion to press or release the first and second brake shoes.

The actuator may further include a housing coupled to a rear side of a back plate on which the first and second brake shoes are installed and having an upper opening to allow the motor to be accommodated, and a cover coupled to the housing to close the upper opening.

The housing may be coupled to a support member penetrating through the back plate to support the power converter in front of the back plate.

The electronic parking brake system may further include a bracket installed in the housing such that a rotation shaft of the motor penetrates through to support the reduction gear unit.

A coupling protrusion may be formed at a lower portion of the bracket, and a coupling groove may be formed on the motor to fit the coupling protrusion.

A damper member to support a lower end of the motor may be provided at a bottom of the housing in which the motor is accommodated.

The reduction gear unit may include a first worm gear coupled to a rotation shaft of the motor, a first worm wheel engaged with the first worm gear, a worm shaft having one end penetrating through the first worm wheel and the other end on which a second worm gear is formed, and a second worm wheel engaged with the second worm gear.

A bearing may be installed at one end of the worm shaft to rotatably support the worm shaft.

A bush may be installed at the other end of the worm shaft to rotatably support the worm shaft.

The other end of the worm shaft provided with the second worm gear may penetrate through the back plate and may be disposed between the first and second brake shoes.

The power converter may include a spindle member having a predetermined length and disposed between the first and second brake shoes to be perpendicular to the worm shaft, and a nut member screwed to opposite sides of the spindle member in a longitudinal direction with respect to the center of the spindle member.

The second worm wheel may be coupled to the center of the spindle member to be coaxial with the spindle member so that the spindle member rotates together with the second worm wheel.

The spindle member may have one side on which a first screw shaft is formed and the other side on which a second screw shaft is formed, based on the second worm wheel, and screw threads provided on outer circumferential surfaces of the first screw shaft and the second screw shaft may be formed in opposite directions to each other.

The nut member may include a first nut coupled to the first screw shaft and a second nut coupled to the second screw shaft, and portions of the first and second nuts coupled to the spindle member may be supported by the first and second brake shoes, respectively, so that rotation of the first and second nuts is restricted.

The first nut may include a first support part supported on the first brake shoe, the second nut may include a second support part supported on the second brake shoe, and the first and second support parts may have a substantially 'C' shape such that webs of the first and second brake shoes are fitted thereto, respectively.

The power converter may further include a support member to support the spindle member and the nut member, and the support member may be fixed to the back plate to surround an outer circumferential surface of the nut member and having a guide hole to guide the movement of the nut member.

The guide hole may be formed to penetrate in a longitudinal direction of the spindle member.

The support member may be integrally formed with a cylinder body of a wheel cylinder to press the first and second brake shoes by hydraulic pressure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter embodiments of the disclosure will be described in detail with reference to the accompanying drawings. The embodiment described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
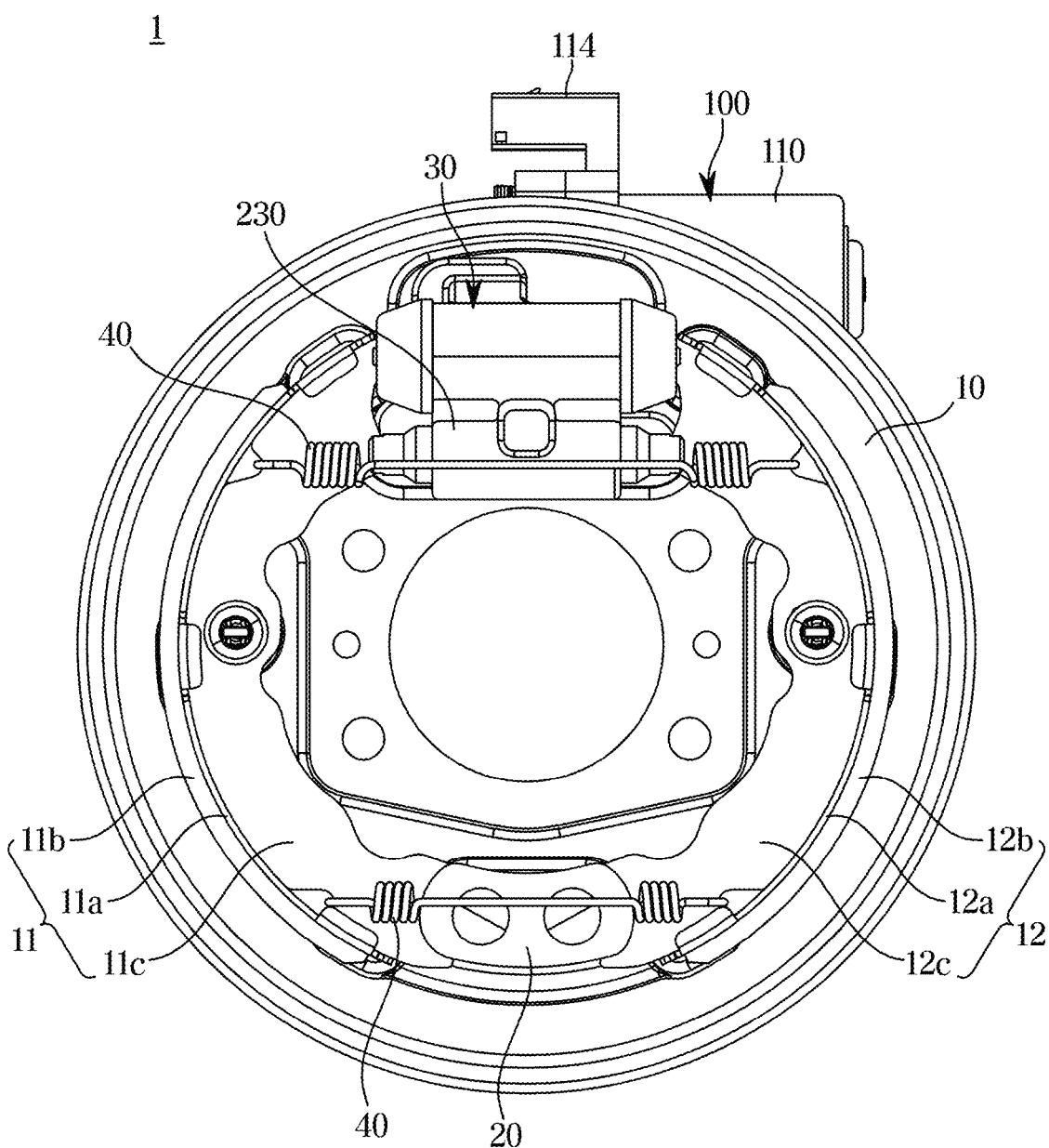
FIG. 1 is a front view of an electronic parking brake system according to an embodiment of the disclosure.
Figure 2:
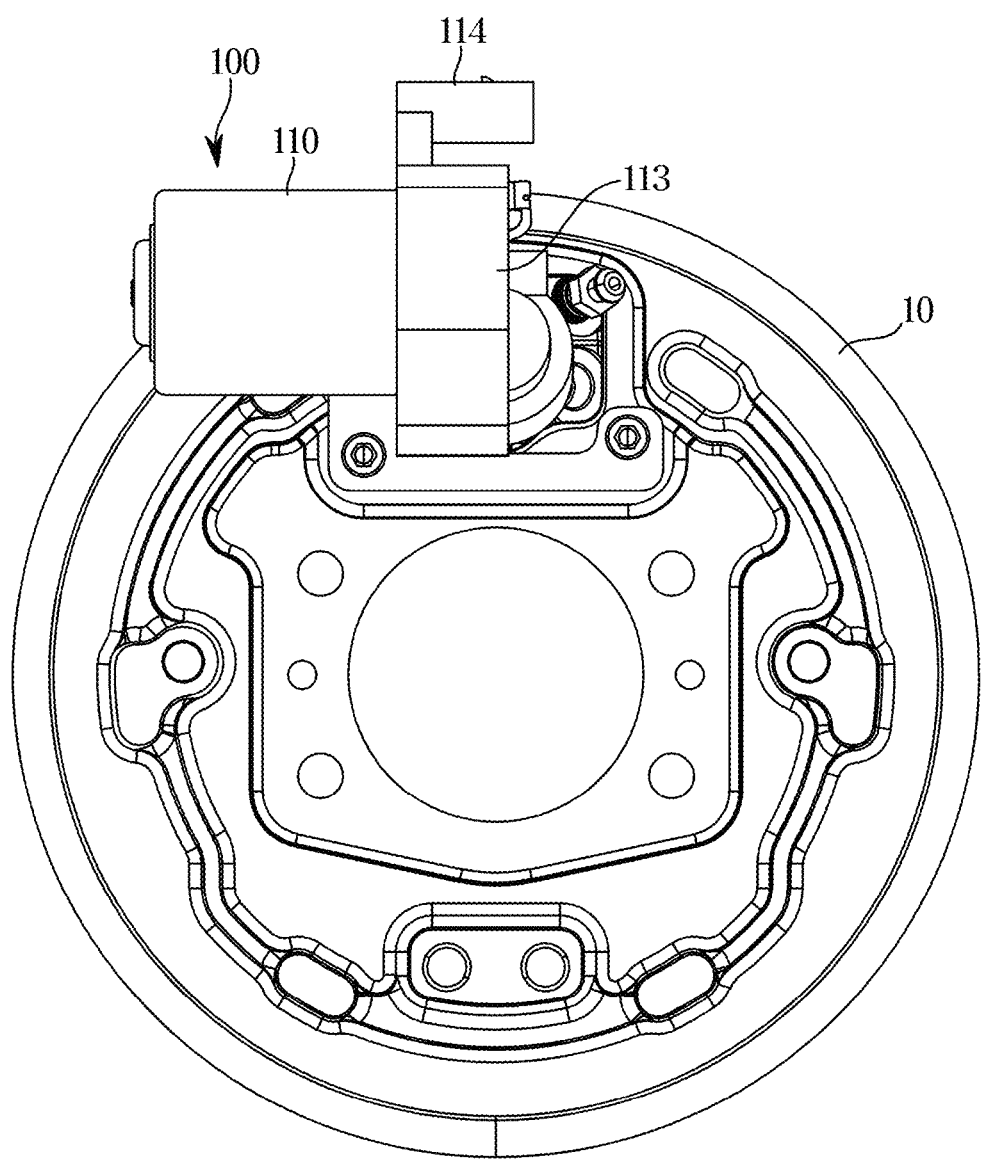
FIG. 2 is a rear view of the electronic parking brake system according to an embodiment of the disclosure.
Figure 3:
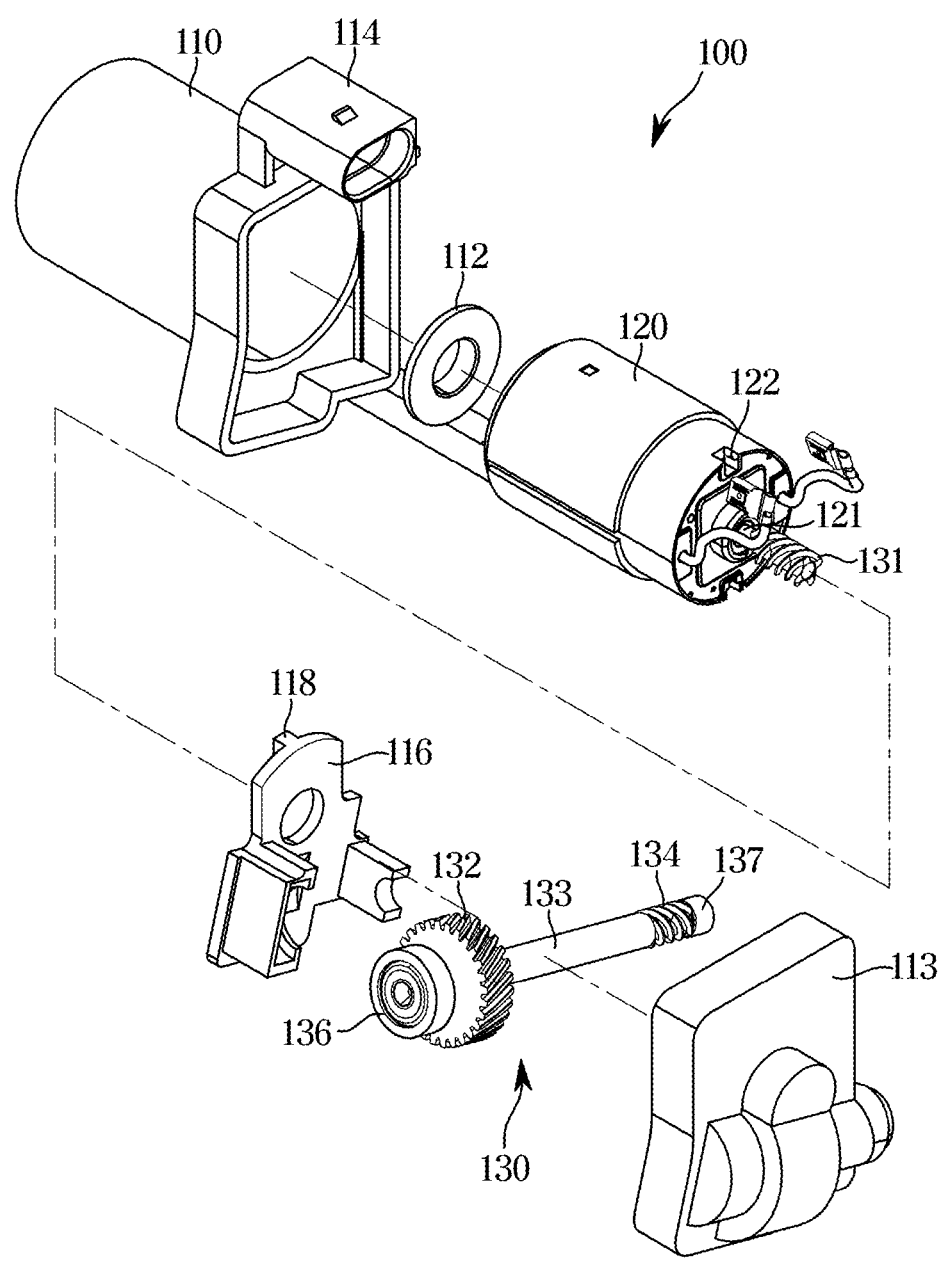
FIG. 3 is an exploded perspective view of an actuator provided in the electronic parking brake system according to an embodiment of the disclosure.
Figure 4:
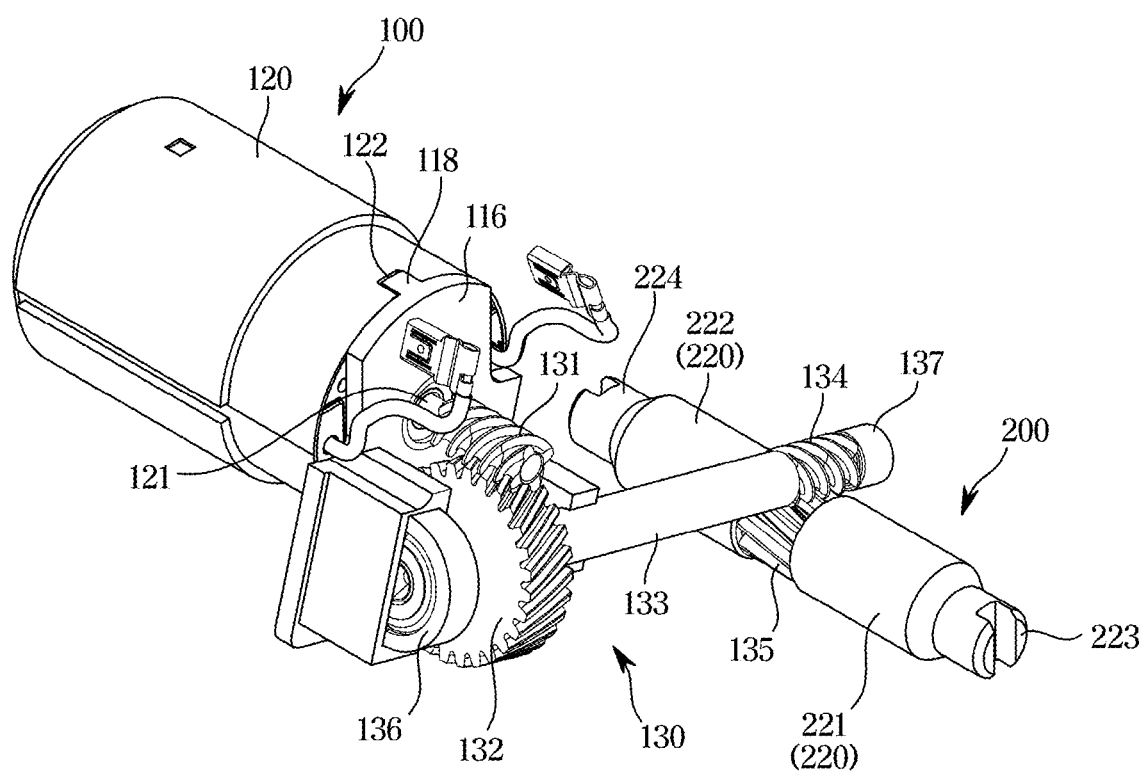
FIG. 4 is a view illustrating that the actuator and a power converter provided in the electronic parking brake system according to an embodiment of the disclosure are combined.
Figure 5:
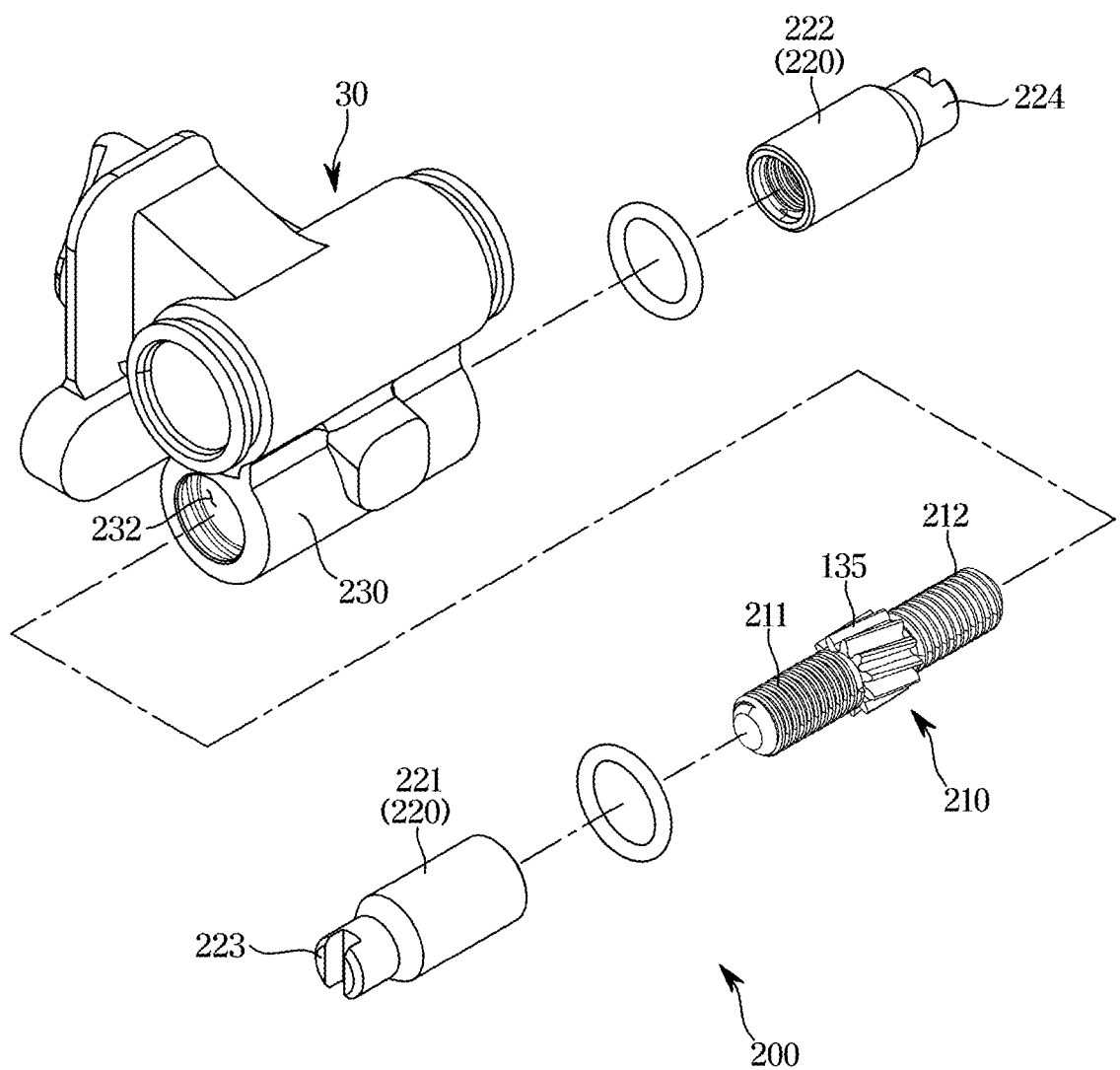
FIG. 5 is an exploded perspective view of the power converter provided in the electronic parking brake system according to an embodiment of the disclosure.
Figure 6:
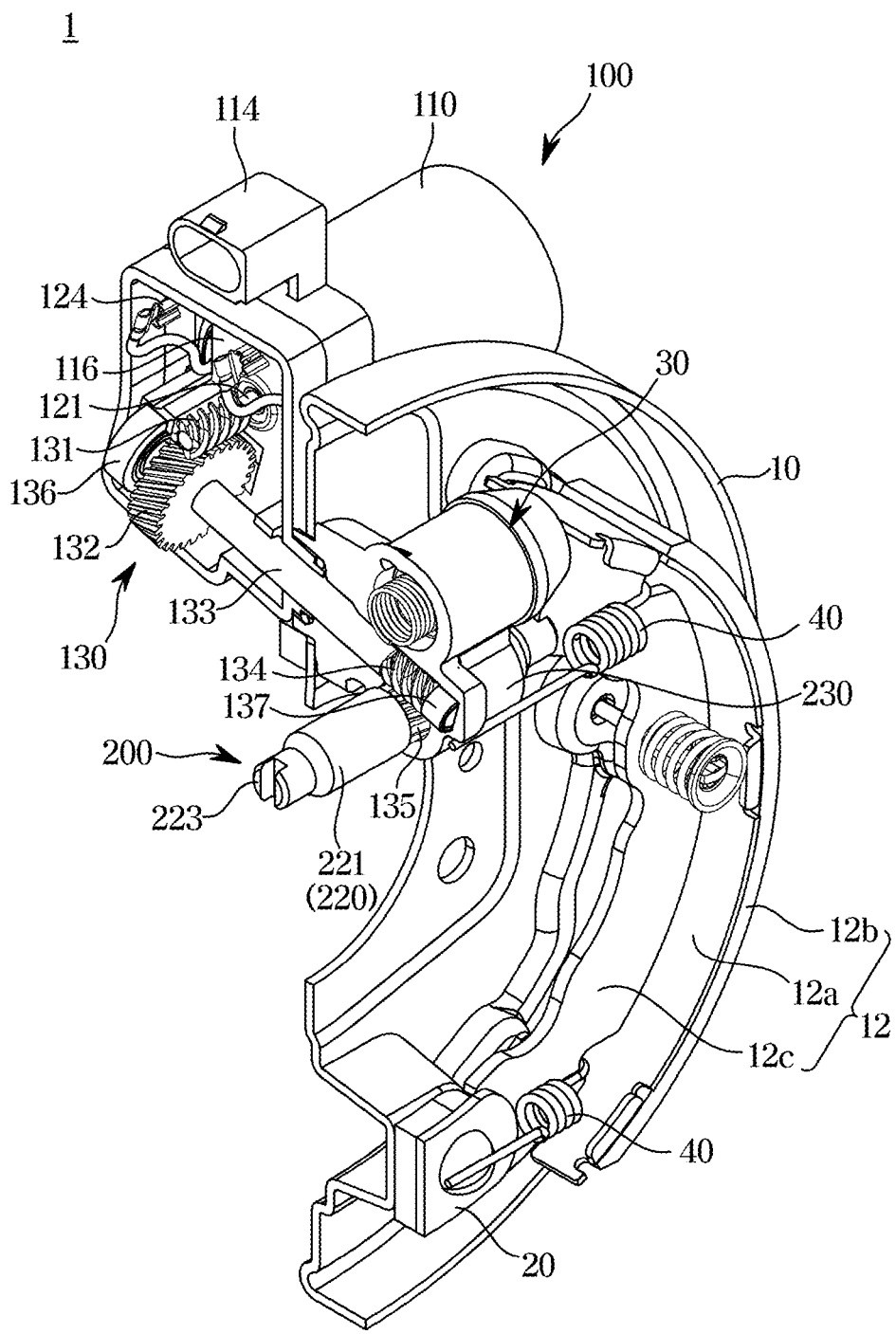
FIG. 6 is a partially cut-away perspective view of the electronic parking brake system according to an embodiment of the disclosure.
Figure 7:
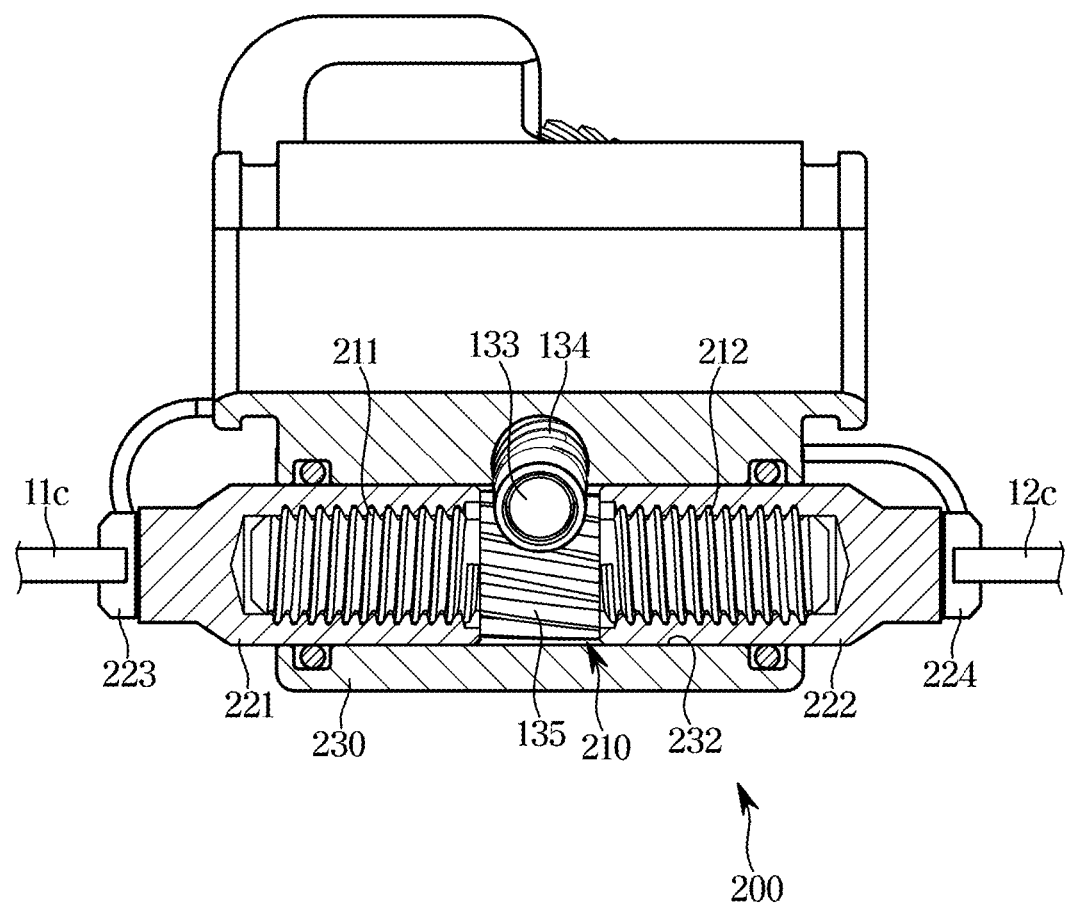
FIG. 7 is a cross-sectional view of the power converter provided in the electronic parking brake system according to an embodiment of the disclosure.
Figure 8:
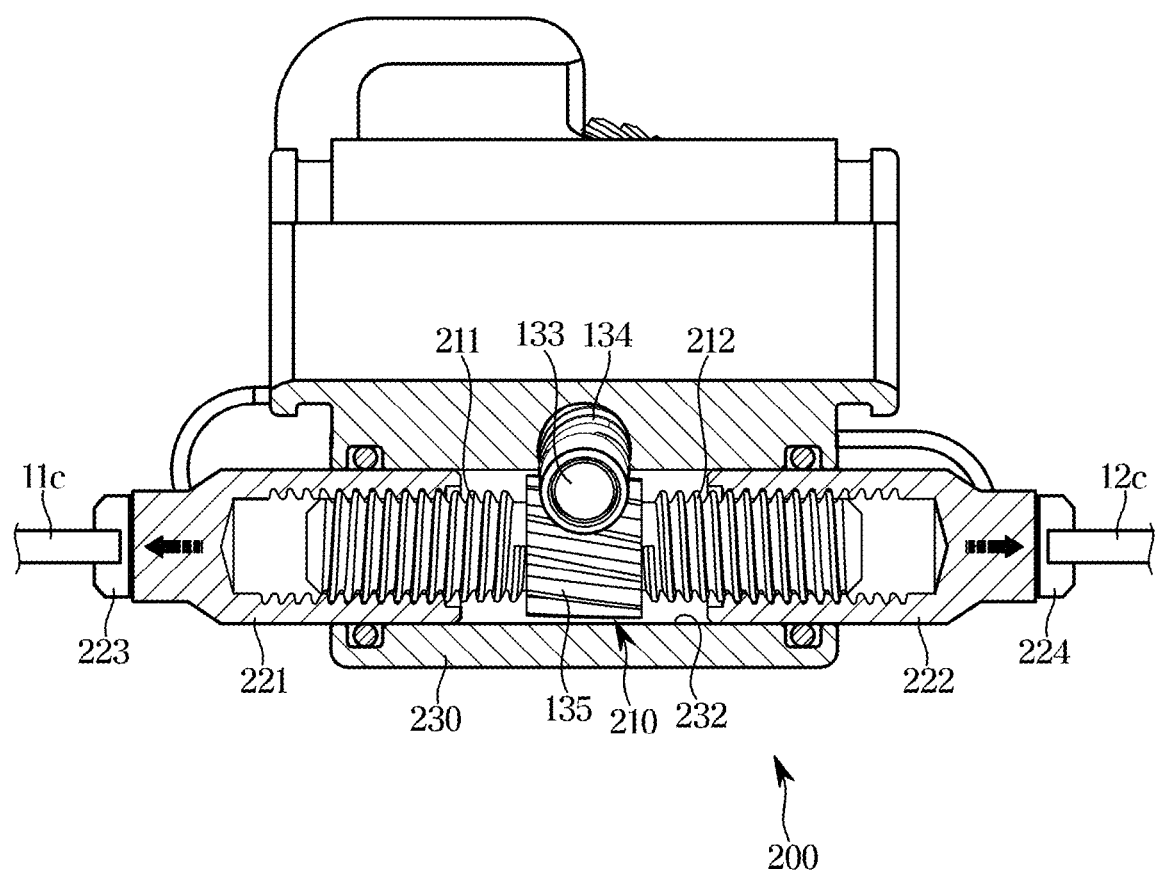
FIG. 8 is a view illustrating that a parking braking force is generated through the electronic parking brake system according to an embodiment of the disclosure.

FIG. 1 is a front view of an electronic parking brake system according to an embodiment of the disclosure, FIG. 2 is a rear view of the electronic parking brake system according to an embodiment of the disclosure, FIG. 3 is an exploded perspective view of an actuator provided in the electronic parking brake system according to an embodiment of the disclosure, FIG. 4 is a view illustrating that the actuator and a power converter provided in the electronic parking brake system according to an embodiment of the disclosure are combined, FIG. 5 is an exploded perspective view of the power converter provided in the electronic parking brake system according to an embodiment of the disclosure, FIG. 6 is a partially cut-away perspective view of the electronic parking brake system according to an embodiment of the disclosure, FIG. 7 is a cross-sectional view of the power converter provided in the electronic parking brake system according to an embodiment of the disclosure, and FIG. 8 is a view illustrating that a parking braking force is generated through the electronic parking brake system according to an embodiment of the disclosure.

Referring to FIGS. 1 to 8, an electronic parking brake system 1 according to an embodiment of the disclosure includes a pair of brake shoes 11 and 12 respectively disposed on opposite sides of the inside of a drum (not shown) rotating together with a wheel of a vehicle, an actuator 100 provided to generate and amplify a driving force for braking, and a power converter 200 provided to receive the driving force from the actuator 100 to press or release the pair of brake shoes 11 and 12.

The pair of brake shoes 11 and 12 are operably mounted outwardly on a back plate 10 coupled to a knuckle part (not shown) of a vehicle body to generate a braking force by coming into close contact with an inner circumferential surface of the drum.

The pair of brake shoes 11 and 12 includes the arc-shaped first brake shoe 11 supported by an anchor block 20 and disposed on a forward rotational direction side of the drum around the anchor block 20, and the second brake shoe 12 disposed on the opposite side thereof. The first and second brake shoes 11 and 12 include semicircular rims 11a and 12a to which linings 11b and 12b are attached, and webs 11c and 12c coupled to inner circumferential surfaces of the rims 11a and 12a to support the rims 11a and 12a, respectively.

Between one end of the web 11c of the first brake shoe 11 and one end of the web 12c of the second brake shoe 12, the anchor block 20 to support the first and second brake shoes 11 and 12 not to be separated during a braking operation is provided, and between the other end of the web 11c of the first brake shoe 11 and the other end of the web 12c of the second brake shoe 12, a wheel cylinder 30 to operate the first and second brake shoes 11 and 12 outward so that the linings 11b and 12b are in close contact with the drum to generate a braking force is installed.

Therefore, when braking hydraulic pressure is transmitted to the wheel cylinder 30, a piston (not shown) disposed inside the wheel cylinder 30 moves forward to the outside, and then the other ends of the first and second brake shoes 11 and 12 are pushed outward while the one ends thereof are rotated around the anchor block 20, so that the first and second brake shoes 11 and 12 generate a braking force by friction with the inner circumferential surface of the drum.

Unexplained reference numeral '40' denotes a return spring that restores the two brake shoes 11 and 12 to their original state after braking.

The actuator 100 includes a motor 120, a reduction gear unit 130 connected to the motor 120, and a housing 110 provided to accommodate the motor 120 and having a bracket 116 for supporting the reduction gear unit 130.

The housing 110 has a top opening to allow the motor 120 to be accommodated and is coupled to the back plate 10. Specifically, the housing 110 is disposed at the rear of the back plate 10, and a portion thereof protrudes toward the front of the back plate 10 on which the first and second brake shoes 11 and 12 are disposed. Accordingly, the portion of the housing 110 protruding toward the front of the back plate 10 may be coupled to a support member 230 for supporting the power converter 200, which will be described later. Although this embodiment illustrates and describes that the housing 110 is coupled to the back plate 10, the disclosure is not limited thereto, and the housing 110 may be coupled to the vehicle body. The motor 120 may be accommodated in the housing 110, and the reduction gear unit 130 may be connected to the motor 120 through the top opening through which the motor 120 is accommodated. The top opening of the housing 110 may be closed by a cover 113.

A damper member 112 provided to support a lower end of the motor 120 and absorb vibration may be installed on a bottom of the housing 110 in which the motor 120 is accommodated. Accordingly, noise caused by vibration may be reduced by the damper member 112.

The housing 110 is provided with a connector 114 for supplying power to the motor 120, and when the motor 120 is installed in the housing 110, a power terminal 124 of the motor 120 is connected to a terminal (not shown) of the connector part 114.

The bracket 116 is disposed between the motor 120 and the reduction gear unit 130 inside the housing 110 through the top opening of the housing 110 to support the reduction gear unit 130, which will be described later. The bracket 116 is coupled in a state in which the motor 120 is accommodated in the housing 110. Accordingly, a passing hole through which a rotation shaft 121 of the motor 120 penetrates is formed on the bracket 116 so that the motor 120 and the reduction gear unit 130 are connected. The bracket 116 may be seated and supported inside the housing 110 and may be coupled to the motor 120 to maintain a stable coupling state. As illustrated in the drawings, a coupling protrusion 118 may be formed at a lower end of the bracket 116, and a coupling groove 122 may be formed at one position of the motor 120 corresponding to the coupling protrusion 118. Therefore, when the bracket 116 is installed in the housing 110, the coupling protrusion 118 is fitted into the coupling groove 122 to provide a stable coupling state to the bracket 116.

The motor 120 may be provided as a known electric motor capable of forward and reverse rotation depending on a flow direction of an applied current. The rotation shaft 121 is provided on the motor 120, and a first worm gear 131 of the reduction gear unit 130, which will be described later, may be coupled to the rotation shaft 121.

The motor 120 may be connected to a control device (not shown) to electrically control the operation of the motor 120. For example, the control device may control various operations of the motor 120 such as operation and stop, forward rotation, and reverse rotation of the motor 120 through input signals transmitted in response to commands of a driver. When a braking operation command or a braking release command is applied by the driver, the control device rotates the motor 120 in a forward or reverse direction. The control device includes a load sensor (not shown) for detecting the magnitude of a force applied to the first and second brake shoes 11 and 12 so that the control device may receive a signal output from the load sensor and stop the motor 120 when the applied force is greater than a predetermined level.

The reduction gear unit 130 includes the first worm gear 131 coupled to the rotation shaft 121 of the motor 120, a first worm wheel 132 engaged with the first worm gear 131, a worm shaft 133 having one end penetrating through the first worm wheel 132 and the other end on which a second worm gear 134 is formed, and a second worm wheel 135 engaged with the second worm gear 134.

The first worm gear 131 is coupled to rotate coaxially with the rotation shaft 121 of the motor 120. In this case, the first worm gear 131 may be integrally formed with the rotation shaft 121. That is, a worm gear-integrated motor may be employed. As the rotation shaft 121 of the motor 120 rotates, the first worm wheel 132 engaged with the first worm gear 131 formed on the rotation shaft 121 receives the rotational force and rotates together with the worm shaft 133. In this case, a bearing 135 for supporting the worm shaft 133 to rotate stably may be further provided.

As illustrated in the drawings, the bearing 136 is coupled to one end of the worm shaft 133 penetrating through the first worm wheel 132. The bearing 136 may be rotatably supported on the bracket 116 coupled to the housing 110 between the motor 120 and the reduction gear unit 130. Accordingly, the worm shaft 133 may be stably rotated by receiving a rotational force from the first worm gear 131.

The worm shaft 133 has a predetermined length and is disposed in a direction perpendicular to the rotation shaft 121. As described above, the first worm wheel 132 is coupled to one side of the worm shaft 133 to rotate together with the first worm wheel 132. The second worm gear 134 is provided on the other side of the worm shaft 133. The second worm gear 134 may be coupled to rotate together with the worm shaft 133, but according to the present embodiment, the second worm gear 134 may be formed by machining gear teeth on the other side of the worm shaft 133. The other end of the worm shaft 133 provided with the second worm gear 134 as described above penetrates through the housing 110 and the support member 230 to be disposed between the first and second brake shoes 11 and 12.

A bush 137 constituting a cylinder body of the wheel cylinder 30 is provided at the other end of the worm shaft 133 so that the worm shaft 133 stably rotates. The bush 137 is supported on the support member 230 for supporting the power converter 200, which will be described later.

The second worm wheel 135 rotates by being engaged with the second worm gear 134. The second worm wheel 135 may be provided on a spindle member 210 of the power converter 200, which will be described later. The second worm wheel 135 may be coupled to the spindle member 210 to rotate together with the spindle member 210. The driving force amplified from the reduction gear unit 130 is transmitted to the power converter 200.

The power converter 200 serves to convert the rotational force transmitted from h reduction gear unit 130 into a linear force to press the first and second brake shoes 11 and 12 toward the inner surface of the drum. Specifically, the power converter 200 includes the spindle member 210, a nut member 220 screwed to the spindle member 210, and the support member 230 to guide the movement of the nut member 220.

The spindle member 210 has a predetermined length and is disposed to be perpendicular to the worm shaft 133. The second worm wheel 135 may be coupled to the center of the spindle member 210 so that the spindle member 210 rotates together with the second worm wheel 135. The spindle member 210 is provided such that a first screw shaft 211 is formed on one side thereof and a second screw shaft 212 is formed on the other side thereof, based on the second worm wheel 135. In this case, the first screw shaft 211 and the second screw shaft 212 are provided to have screw threads in opposite directions to each other. For example, a left-hand screw thread may be formed on the first screw shaft 211, and a right-hand screw thread may be formed on the second screw shaft 212.

The nut member 220 is coupled to opposite ends of the spindle member 210 in a longitudinal direction. The nut member 220 is configured to press the first and second brake shoes 11 and 12 toward the inner surface of the drum. The nut member 220 may include a first nut 221 screwed to the first screw shaft 211 provided on one side of the spindle member 210, and a second screw shaft 222 screwed to the second screw shaft 212 provided on the other side of the spindle member 210.

The first nut 221 has a screw thread formed on an inner circumferential surface thereof to be screwed to the spindle member 210, and a first support part 223 is formed at one end thereof. Accordingly, in a state in which the first nut 221 is screwed to the first screw shaft 211, the first support part 223 is supported on the web 11c of the first brake shoe 11.

The second nut 222 has a screw thread formed on an inner circumferential surface thereof to be screwed to the spindle member 210, and a second support part 224 is formed at one end thereof. Accordingly, in a state in which the second nut 222 is screwed to the second screw shaft 212, the second support part 224 is supported on the web 12c of the second brake shoe 12.

The first and second support parts 223 and 224 may be provided in a substantially 'C' shape to be stably supported on the webs 11c and 12c, respectively. Accordingly, the webs 11c and 12c are inserted into the first and second support parts 223 and 224, respectively, to be stably supported. Therefore, when the spindle member 210 rotates, rotation of the first nut 221 and the second nut 222 is restricted by the webs 11c and 12c, respectively, so that the first nut 221 and the second nut 222 may move linearly along the longitudinal direction of the spindle member 210 to press or release the first and second brake shoes 11 and 12.

As the screw threads are formed in the first screw shaft 211 and the second screw shaft 212 in opposite directions, the first nut 221 and the second nut 222 move in a direction away from each other (parking braking direction) or move in a direction approaching each other (parking braking release direction) depending on the rotation direction of the spindle member 210.

The support member 230 is fixed to the back plate 10 to surround outer circumferential surfaces of the spindle member 210 and the nut member 220, and serves to guide the nut member 220 that moves in a straight line. As described above, the support member 230 may be integrally formed to constitute the cylinder body of the wheel cylinder 30 that is operated by hydraulic pressure to press the first and second brake shoes 11 and 12. A guide hole 232 for guiding the movement of the first nut 221 and the second nut 222 is formed in the support member 230.

The guide hole 232 is formed to penetrate in the longitudinal direction of the spindle member 210. That is, the spindle member 210 on which the second worm wheel 135 is installed and the first and second nuts 221 and 222 are disposed in the guide hole 232. In this case, the first and second support parts 223 and 224 of the first and second nuts 221 and 222 are exposed to the outside of the guide hole 232 to be supported on the webs 11c and 12c of the first and second brake shoes 11 and 12, respectively. The guide hole 232 is provided to communicate with a passing hole through which the worm shaft 133 penetrates to receive a rotational force from the second worm gear 134 of the worm shaft 133.

Hereinafter, the parking braking operation of the electronic parking brake system 1 as described above will be described.

First, when the driver of the vehicle presses the control device (not shown), for example, a parking switch (not shown) in a state in which the first and second brake shoes 11 and 12 are spaced apart from the inner surface of the drum (in a state in which the braking is released), the motor 120 operates to generate a driving force in response to the pressing signal. That is, the rotation shaft 121 of the motor 120 rotates forward to transmit a rotational force to the reduction gear unit 130, The reduction gear unit 130 has a structure of a worm reducer so that the first worm wheel 132 engaged with the first worm gear 131 rotates, and the worm shaft 133 coupled to the first worm wheel 132 and the second worm gear 134 formed on the worm shaft 133 rotate together to transmit the rotational force to the second worm wheel 135. At this time, as the second worm wheel 135 is provided to rotate together with the spindle member 210 of the power converter 200, the second worm wheel 135 rotates the spindle member 210. That is, as the spindle member 210 rotates, as illustrated in FIG. 8, the first nut 221 and the second nut 222 screwed to opposite sides of the spindle member 210, respectively, move linearly to press the first and second brake shoes 11 and 12 to the inner surface of the drum, thereby performing the parking braking.

The parking braking force may be released when the motor 120 generates a driving force in a direction opposite to the braking direction. That is, as the motor 210 rotates in the opposite direction, but the rotational force of the motor 210 is transmitted the same as in the case of parking braking, the first nut 221 and the second nut 222 move to the original positions, thereby releasing the parking braking force.

As is apparent from the above, an electronic parking brake system according to an embodiment of the disclosure can not only operate smoothly and stably by improving a power transmission connection structure, but can also generate a large braking force.

Further, the electronic parking brake system according to an embodiment of the disclosure may increase the efficiency of an installation space.

While the disclosure has been particularly described with reference to exemplary embodiments, it should be understood by those of skilled in the art that various changes in form and details may be made without departing from the spirit and scope of the disclosure.

What is claimed is:

1. An electronic parking brake system for pushing first and second brake shoes respectively disposed on inner opposite sides of a drum to an inner surface of the drum for braking, comprising:
    an actuator comprising a motor configured to rotate forward and reverse to generate a driving force for braking, and a reduction gear unit configured to amplify the driving force transmitted from the motor; and
    a power converter configured to convert a rotational motion from the actuator into a linear motion to press or release the first and second brake shoes,
    wherein the actuator further comprises:
    a housing coupled to a rear side of a back plate on which the first and second brake shoes are installed and having an upper opening to allow the motor to be accommodated; and
    a cover coupled to the housing to close the upper opening,
    wherein the reduction gear unit comprises:
    a first worm gear coupled to a rotation shaft of the motor;

a first worm wheel engaged with the first worm gear;
a worm shaft having one end penetrating through the first worm wheel and the other end on which a second worm gear is formed; and
a second worm wheel engaged with the second worm gear,
the worm shaft is positioned perpendicular to the direction in which the cover is coupled to the housing, and is hung on the housing and the cover, respectively.

2. The electronic parking brake system according to claim 1, wherein
the housing is coupled to a support member penetrating through the back plate to support the power converter in front of the back plate.

3. The electronic parking brake system according to claim 1, further comprising
a bracket installed in the housing such that a rotation shaft of the motor penetrates through to support the reduction gear unit.

4. The electronic parking brake system according to claim 3, wherein
a coupling protrusion is formed at a lower portion of the bracket, and a coupling groove is formed on the motor to fit the coupling protrusion.

5. The electronic parking brake system according to claim 1, wherein
a damper member to support a lower end of the motor is provided at a bottom of the housing in which the motor is accommodated.

6. The electronic parking brake system according to claim 1, wherein
a bearing is installed at one end of the worm shaft to rotatably support the worm shaft.

7. The electronic parking brake system according to claim 1, wherein
a bush is installed at the other end of the worm shaft to rotatably support the worm shaft.

8. The electronic parking brake system according to claim 1, wherein
the other end of the worm shaft provided with the second worm gear penetrates through the back plate and is disposed between the first and second brake shoes.

9. The electronic parking brake system according to claim 1, wherein
the power converter comprises:
a spindle member having a predetermined length and disposed between the first and second brake shoes to be perpendicular to the worm shaft; and
nut members screwed to opposite sides of the spindle member, respectively, in a longitudinal direction with respect to the center of the spindle member.

10. The electronic parking brake system according to claim 9, wherein
the second worm wheel is coupled to the center of the spindle member to be coaxial with the spindle member so that the spindle member rotates together with the second worm wheel.

11. The electronic parking brake system according to claim 10, wherein
the spindle member has one side on which a first screw shaft is formed and the other side on which a second screw shaft is formed, based on the second worm wheel, and
screw threads provided on outer circumferential surfaces of the first screw shaft and the second screw shaft are formed in opposite directions to each other.

12. The electronic parking brake system according to claim 11, wherein
the nut members comprise a first nut coupled to the first screw shaft and a second nut coupled to the second screw shaft, and
portions of the first and second nuts coupled to the spindle member are supported by the first and second brake shoes, respectively, so that rotation of the first and second nuts is restricted.

13. The electronic parking brake system according to claim 12, wherein
the first nut comprises a first support part supported on the first brake shoe,
the second nut comprises a second support part supported on the second brake shoe, and
the first and second support parts have a substantially 'C' shape such that webs of the first and second brake shoes are fitted thereto, respectively.

14. The electronic parking brake system according to claim 1, wherein
the power converter further comprises a support member to support the spindle member and the nut member, and
the support member is fixed to the back plate to surround an outer circumferential surface of the nut members and having a guide hole to guide the movement of the nut members.

15. The electronic parking brake system according to claim 14, wherein
the guide hole is formed to penetrate in a longitudinal direction of the spindle member.

16. The electronic parking brake system according to claim 14, wherein
the support member is integrally formed with a cylinder body of a wheel cylinder to press the first and second brake shoes by hydraulic pressure.

* * * * *